（12) United States Patent
Bhatt et al.

(10) Patent No.: US 12,137,133 B2
(45) Date of Patent: Nov. 5, 2024

(54) SYNCHRONIZATION OF STREAMING CONTENT USING LIVE EDGE OFFSETS

(71) Applicant: YAHOO ASSETS LLC, New York, NY (US)

(72) Inventors: Mikul Bhatt, Danville, CA (US); Ajit Bhate, Los Gatos, CA (US); Sreekanth Mamidala, Mountain House, CA (US); Judes Sarmiento, Redwood City, CA (US); Robert Rallison, Smithfield, UT (US); John Bowers, Provo, UT (US); Neha Dike, San Jose, CA (US); Amit Agarwal, Sunnyvale, CA (US); Alex Austin, Farmington, UT (US); Anupam Kumar, Dublin, CA (US); James Lou, Cupertino, CA (US); Herry Leonard, Fremont, CA (US); Ronald Jacoby, Saratoga, CA (US); Roger Urrabazo, Gilroy, CA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 18/297,101

(22) Filed: Apr. 7, 2023

(65) Prior Publication Data

US 2023/0247074 A1 Aug. 3, 2023

Related U.S. Application Data

(63) Continuation of application No. 17/460,813, filed on Aug. 30, 2021, now Pat. No. 11,652,860.

(60) Provisional application No. 63/073,199, filed on Sep. 1, 2020.

(51) Int. Cl.
*H04L 65/61* (2022.01)

(52) U.S. Cl.
CPC .................................. *H04L 65/61* (2022.05)

(58) Field of Classification Search
CPC ........................................................ H04L 65/61
USPC ........................................................ 709/248
See application file for complete search history.

(56) References Cited

U.S. PATENT DOCUMENTS

| 2014/0230003 | A1 | 8/2014 | Ma et al. | |
|---|---|---|---|---|
| 2016/0105691 | A1* | 4/2016 | Zucchetta | H04N 21/436 |
| | | | | 725/82 |
| 2020/0314479 | A1* | 10/2020 | Umansky | H04N 21/8133 |

FOREIGN PATENT DOCUMENTS

| JP | 4042396 B2 * | 2/2008 |
|---|---|---|
| JP | 2013504948 A | 2/2013 |
| WO | WO-2022046664 A1 * | 3/2022 |

* cited by examiner

*Primary Examiner* — Glenford J Madamba
(74) *Attorney, Agent, or Firm* — James J. DeCarlo; Greenberg Traurig, LLP

(57) ABSTRACT

In some aspects, the techniques described herein relate to a method including: receiving a request from a client device to join a room, the room associate with a plurality of other client devices streaming multimedia content; adding the client device to the room in response to the request; computing a synchronization time for the client based on time values associated with the client device and the other client devices; and transmitting the synchronization time to the client device, causing the client device to adjust playback of the multimedia content based on the synchronization time.

17 Claims, 13 Drawing Sheets

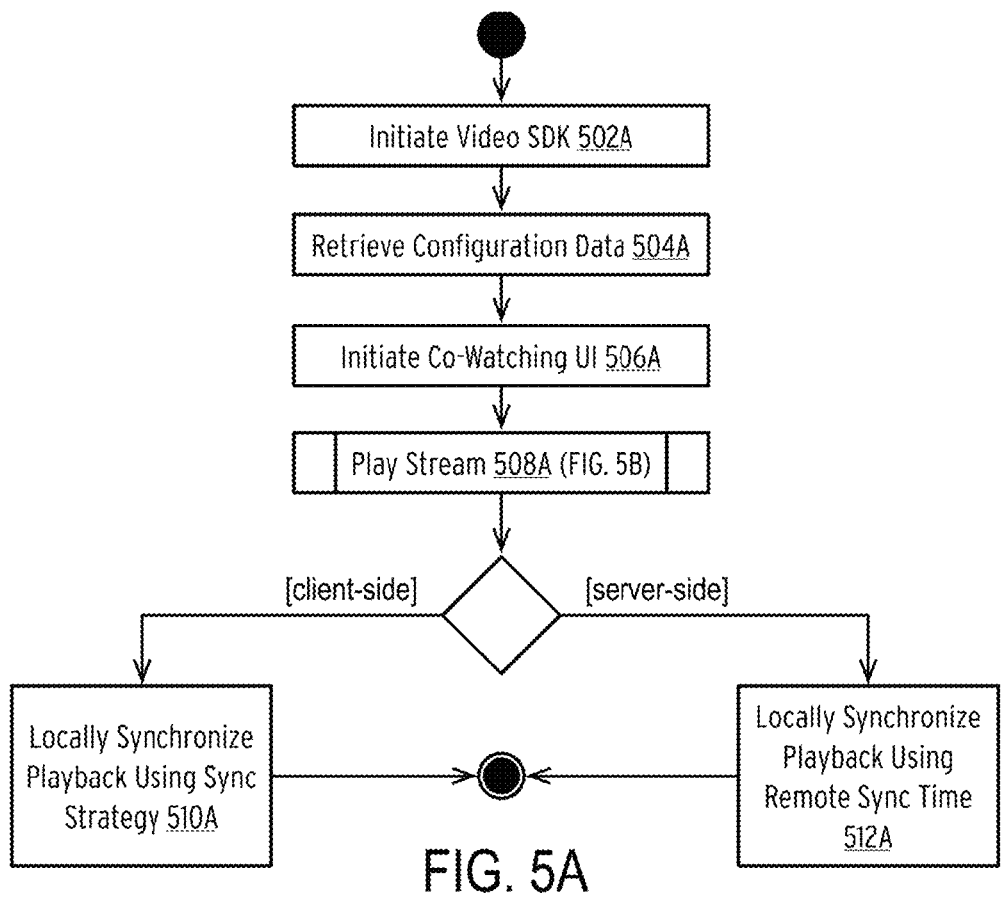
FIG. 5A
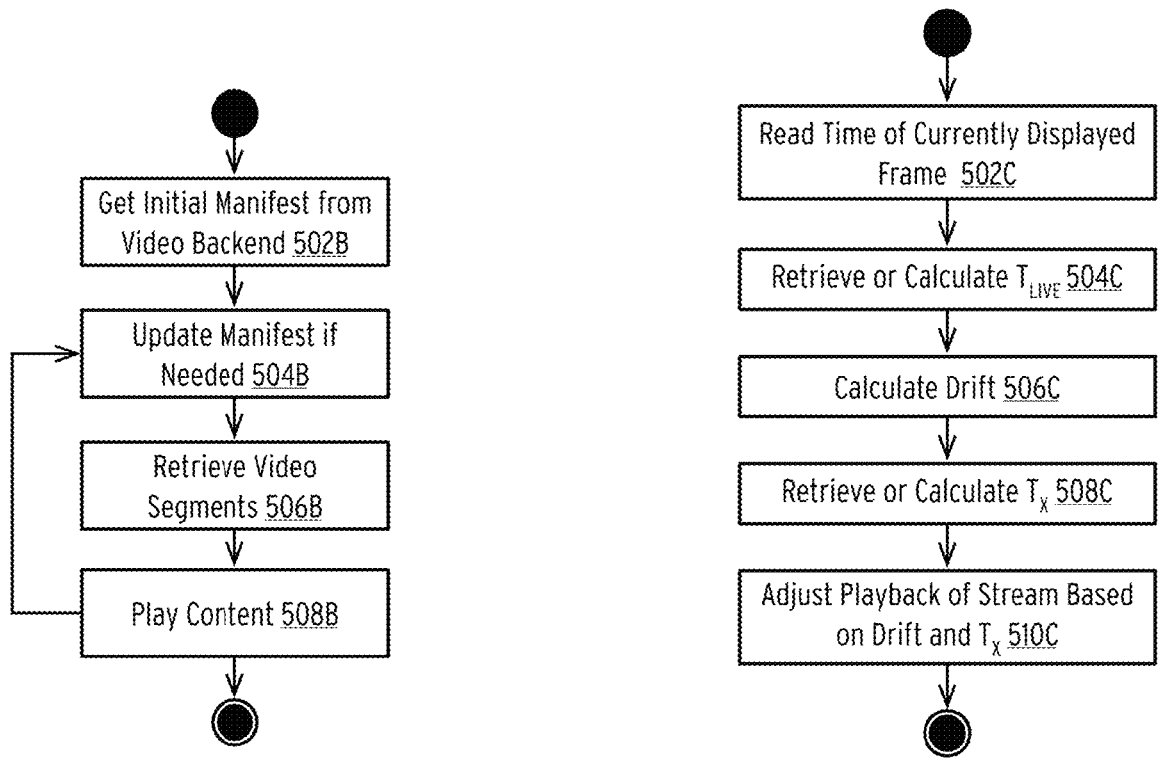
FIG. 5B
FIG. 5C

SYNCHRONIZATION OF STREAMING CONTENT USING LIVE EDGE OFFSETS

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

CROSS-REFERENCE TO RELATED APPLICATIONS

The application claims the benefit of U.S. application Ser. No. 17/460,813, filed Aug. 30, 2021, which claims the benefit of U.S. Provisional Pat. Appl. No. 63/073,199, filed Sep. 1, 2020, the content of which are incorporated by reference in their entirety.

BACKGROUND

Currently, various technologies exist for streamlining multimedia (e.g., video and audio) content, including live multimedia content, using traditional Hypertext Transfer Protocol ("HTTP") servers. Examples of such technologies include HTTP Live Streaming ("HLS") and Dynamic Adaptive Streaming over HTTP ("DASH"). In both technologies, and in similar technologies, a streaming multimedia source (e.g., file) is partitioned into smaller segments or slices. A manifest such as an M3U8 playlist (for HLS) or media presentation description (MPD) file (for DASH) is used to define the segments for a given time interval. A client device retrieves the manifest, downloads the segments, and plays back the segments to provide streamlining of the multimedia file.

In traditional deployments, each client device streams a multimedia video independently of other devices. Thus, even if two client devices are streamlining the same live multimedia file, the timing of the streams relative to each other is of no importance since each viewer is viewing the file independently. Recently, however, various platforms have merged video conferencing capabilities with multimedia streamlining technologies. These platforms attempt to allow users to watch live or pre-recorded content "together" while physically being separated.

Generally, these platforms utilize peer-to-peer ("P2P") communications protocols (e.g., WebRTC) to synchronize video streams among client devices. Such an approach, however, requires clients to use the same streamlining technology (e.g., real-time transport protocol, RTP). Further, the use of P2P protocols generally cannot account for dynamic advertising insertions in live programming.

Thus, while the use of P2P protocols provides rough synchronization, such techniques cannot provide frame-level synchronization and cannot adequately support dynamic content insertion or the use of studio-approved digital rights management (DRM) systems.

BRIEF SUMMARY

The disclosed embodiments describe methods, devices, systems, and computer-readable media for synchronizing streamlining multimedia files among client devices.

FIG. 1 is a diagram illustrating the positions of client device playback of a multimedia file at a given point in time.

In the illustrated embodiment, a snapshot of the positions ($T_{P1}$, $T_{P2}$, $T_{P3}$, $T_{P4}$) of four client devices streaming a multimedia file at a current time ($T_{NOW}$). In the illustrated embodiment, the value of $T_{NOW}$ comprises the current time. In some embodiments, the value of $T_{NOW}$ can be determined using a network time protocol (NTP) or a similar universal clock source. Colloquially, the value of $T_{NOW}$ can be considered the "current time" at any given moment. As illustrated, time points to the right of $T_{NOW}$ occur in the future while points to the left represent points in the past. Since future data cannot be received prior to being recorded at $T_{NOW}$, no data points exist to the right of $T_{NOW}$. However, since various delays result in the currently displayed content between "in the past" when compared to the content recorded at $T_{NOW}$, various points to the left of $T_{NOW}$ illustrate these delays and are discussed in more detail herein.

In the illustrated embodiment, a second time point ($T_{LIVE}$) comprises the minimum global delay that is perceived by each viewer. In most embodiments, the difference between $T_{NOW}$ and $T_{LIVE}$ ($T_{BL}$ 102) comprises an amount of time required to process live content. In some embodiments, the value of $T_{BL}$ comprises the amount of time required to process recorded live multimedia content into a format suitable for live streaming. For example, the value of $T_{BL}$ may comprise the amount of time required to encode a recorded segment of multimedia and transmit the segment to a cloud delivery network ("CDN"). In some embodiments, the value of $T_{BL}$ may be a fixed value. In other embodiments, the value of $T_{BL}$ may vary between a maximum and minimum threshold.

In an optimal, but not achievable scenario, all client devices receive streamlining content at $T_{LIVE}$. That is, in an idealized scenario, there are no network delays in re-transmitting the content, no buffering, etc. In general, only the CDN (the device that receives the encoded content) receives streaming content at or very near $T_{LIVE}$. By contrast, at time $T_{NOW}$, all devices (P1, P2, P3, P4) are displaying content slightly behind the content recorded at $T_{NOW}$ and encoded by time $T_{LIVE}$.

In the illustrated embodiment, the delay in receipt of content for devices (P1, P2, P3, and P4) are represented as drifts ($Drift_{P1}$, $Drift_{P2}$, $Drift_{P3}$, and $Drift_{P4}$). In general, a drift value is represented as the difference between the $T_{LIVE}$ value and the program datetime (PDT) timestamp value of a currently displayed frame ($Drift_{PN} = T_{LIVE} - PDT_{PN}$). As illustrated, each device may have a different drift value based on network latency, buffering status, and various other technical factors. For example, device (P1) may have a strong network connection and be geographically closer to the CDN transmitting the streaming media. Conversely, device (P4) may have a weak network connection, be geographically far from a CDN, or be streamlining at a higher bit rate. As a result, each device (P1, P2, P3, P4) may have different drift times ($Drift_{P1}$, $Drift_{P2}$, $Drift_{P3}$, and $Drift_{P4}$) and thus at any given moment ($T_{NOW}$) may be displaying slightly different positions in the content.

The disclosed embodiments remedy this difference by ensuring that all client devices are synchronized in displaying content at an identical, or nearly identical, time ($T_X$) whether they are viewing the same content or individually different content that is equally encoded and served via the methods described herein. Although illustrated as occurring midway between the positions ($T_{P1}$, $T_{P2}$, $T_{P3}$, $T_{P4}$) of four client devices, other positions of ($T_X$) may be used and are described herein.

In one embodiment, a client-side implementation is disclosed that synchronizes all devices viewing a live stream to a fixed value of $T_X$ relative to $T_{NOW}$. Notably, by computing a value ($T_X$) relative to a synchronized global time ($T_{NOW}$), any given client device does not need to receive or otherwise store the value of $T_{LIVE}$. Since the value of $T_{LIVE}$ may dynamically change between sessions, or could be different across various protocols, this enables true, cross-platform synchronization of streaming content. In this embodiment, a client-side algorithm on each device optimizes to keep all the participants to a constant, fixed latency behind $T_{NOW}$. Clients can be provided with the static synchronization configuration when initializing a multimedia stream, and all the clients maintain constant latency by staying a specific time behind the $T_{NOW}$. This specific time (e.g., x seconds behind $T_{NOW}$) serves as the global synchronization point for all client devices.

In other embodiments, a server-side embodiment is disclosed that supports varying values of $T_X$ for smaller cohorts of viewers. In this embodiment, a client-server architecture achieves local synchronization for a single co-watching session (referred to alternatively as a "room") for a multimedia stream, where all the clients in a single co-watching session publish their own timing information to a backend server. The backend server computes the synchronization time and broadcasts this information back to the client devices. There can be multiple strategies to compute ideal synchronization time for a given input, as discussed in further detail herein.

These and various other embodiments are described in more detail below.

BRIEF DESCRIPTION OF THE DRAWINGS

FIG. 5A is a flow diagram illustrating a method for synchronizing playback of a multimedia stream according to some embodiments of the disclosure.

FIG. 5B is a flow diagram illustrating a method for playing back a multimedia stream according to some embodiments of the disclosure.

FIG. 5C is a flow diagram illustrating a method for adjusting the playback of a multimedia player according to some embodiments of the disclosure.

DETAILED DESCRIPTION

Figure 1:
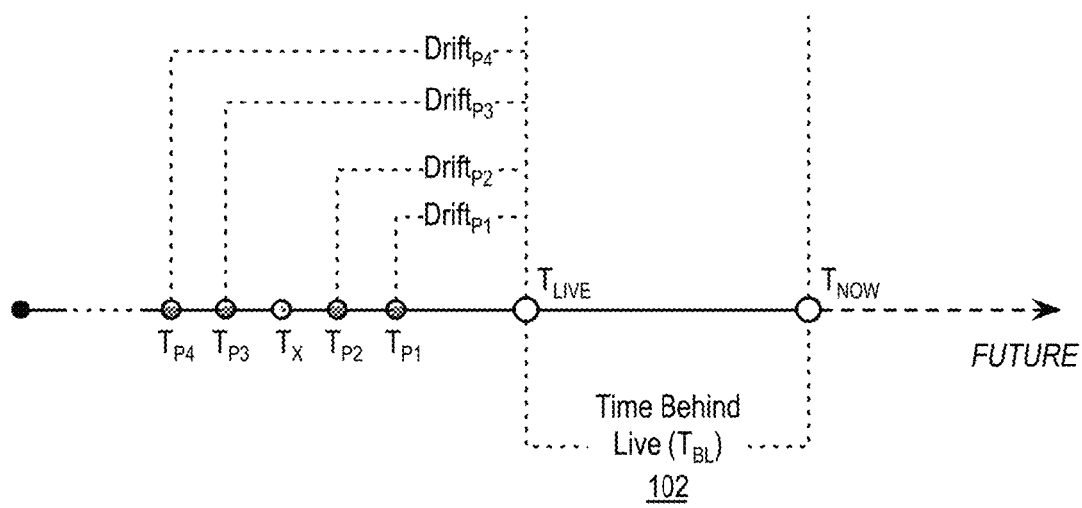
FIG. 1 is a diagram illustrating the positions of client device playback of a multimedia file at a given point in time.
Figure 2:
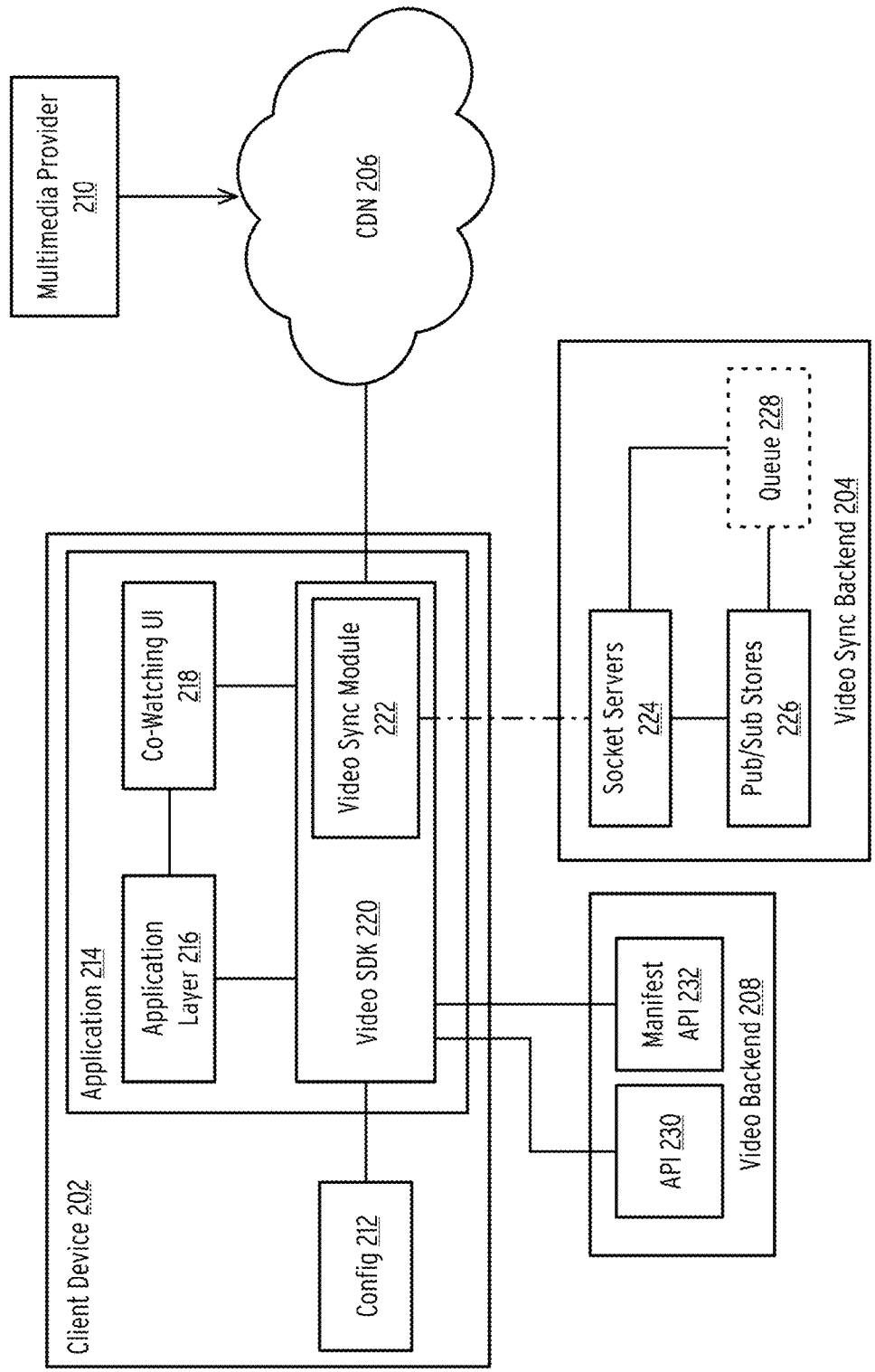
FIG. 2 is a block diagram of a computing system for synchronizing streaming media content according to some embodiments of the disclosure.

FIG. 2 is a block diagram of a computing system for synchronizing streaming media content according to some embodiments of the disclosure. The following description includes a description of the components of the system, as well as the methods and operations performed by the system and by individual components. In the illustrated embodiment, the client device (202) may include a non-transitory computer-readable storage medium for tangibly storing computer program instructions capable of being executed by a computer processor, wherein the program instructions perform the methods and operations described below. Further, the video backend (208), video synchronization backend (204), CDN (206), and multimedia provider (210) may also include non-transitory computer-readable storage media for tangibly storing computer program instructions capable of being executed by a computer processor, wherein the program instructions perform the relevant methods and operations described below. However, as indicated, various details of video synchronization backend (204) are provided in more detail in the descriptions of FIGS. 3 and 4.

Figure 6:
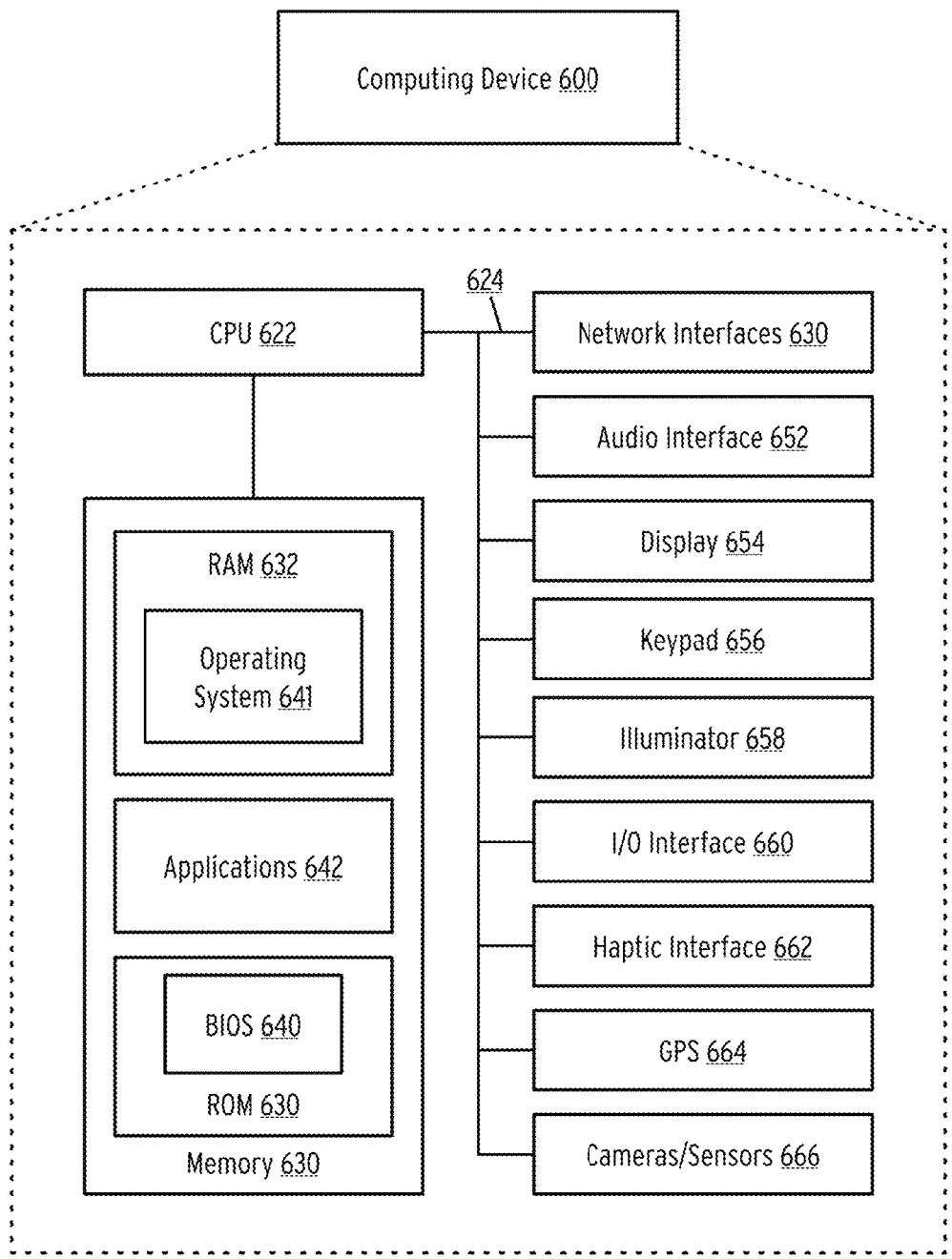
FIG. 6 is a block diagram illustrating a computing device showing an example embodiment of a computing device used in the various embodiments of the disclosure.

In the illustrated embodiment, a client device (202) is communicatively connected to a video backend (208), video synchronization backend (204), and a CDN (206). In the illustrated embodiment, the client device (202) may comprise a mobile computing device (e.g., mobile phone, tablet, etc.), desktop or laptop computing device, wearable computing device (e.g., smartwatch), or any other computing device with a display, capable of receiving content. FIG. 6 depicts an exemplary computing device that may be used as client device (202) or server devices (e.g., video synchronization backend 204, CDN 206, video backend 208, multimedia provider 210).

The client device (202) includes a streaming media application (214). In one embodiment, the client device (202) comprises a mobile device running the Android® or iOS® operating system, although the specific operating system is not limiting. The streaming media application (214) may comprise a software application running in memory of the client device (202). As will be described, the streaming media application (214) enables the streaming of content from CDN (206) as well as the synchronization of such streaming content with one or more other client devices (not pictured). In some embodiments, the streaming media application (214) comprises a standalone application. In other embodiments, the streaming media application (214) may comprise part of a larger application.

The streaming media application (214) includes an application layer (216). In the illustrated embodiment, the application layer (216) comprises a primary application layer that manages other components of the streaming media application (214). In some embodiments, the application layer (216) comprises a general-purpose layer for managing the streaming media application (214). For example, the application layer (216) may provide a listing of streams and a user interface to initiate a viewing session with one or more other client devices. As will be discussed, various aspects of implementing those operations may be delegated to other components.

The streaming media application (214) additionally includes a co-watching user interface (UI), such as co-watching UI (218). In one embodiment, co-watching UI (218) is instantiated in response to the selection of a video stream by the application layer (216). In one embodiment, the co-watching UI (218) includes code to manage a "room" of participants watching the same streaming multimedia file, as will be described in more detail herein. In some embodiments, co-watching UI (218) is further configured to communicate with the video software development kit (SDK) (220) to trigger the playback of a multimedia file.

In the illustrated embodiment, the streaming media application (214) additionally includes a video SDK (220). The video SDK (220) receives an initiation signal from the application layer (216) (step 502a). In one embodiment, the application layer transmits the initiation signal upon startup. In response, the video SDK (220) retrieves configuration data from the configuration module (212) (step 504a). In one embodiment, the configuration data may comprise a fixed offset value in, for example, microseconds. In one embodiment, the video SDK (220) uses this fixed offset value to compute the value $T_X$ to maintain the multimedia playback of a stream. In one embodiment, this offset value is common among all client devices.

Figure 5D:
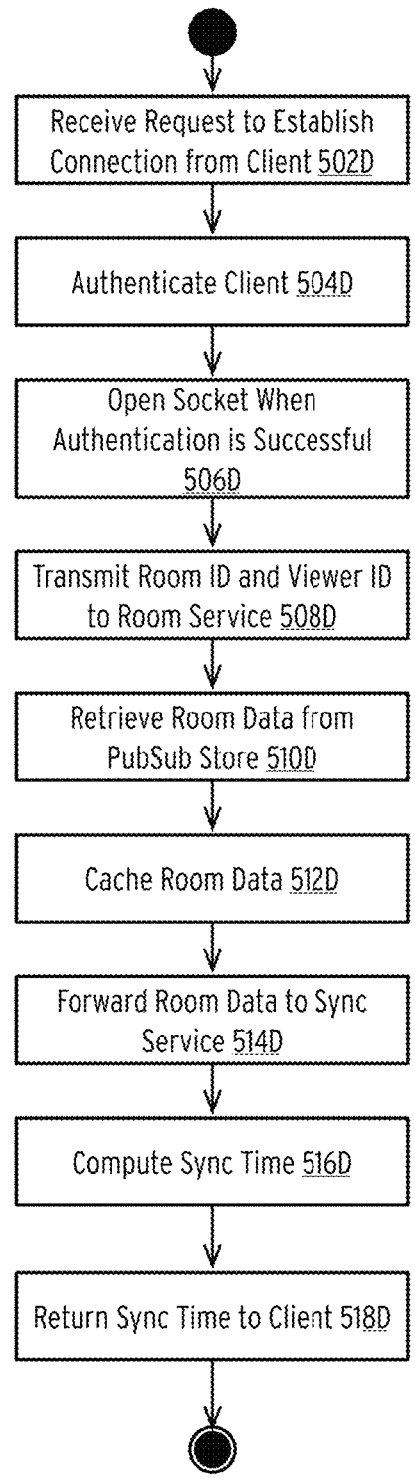
FIG. 5D is a flow diagram illustrating a method for opening a socket and joining a room according to some embodiments of the disclosure.
Figure 5E:
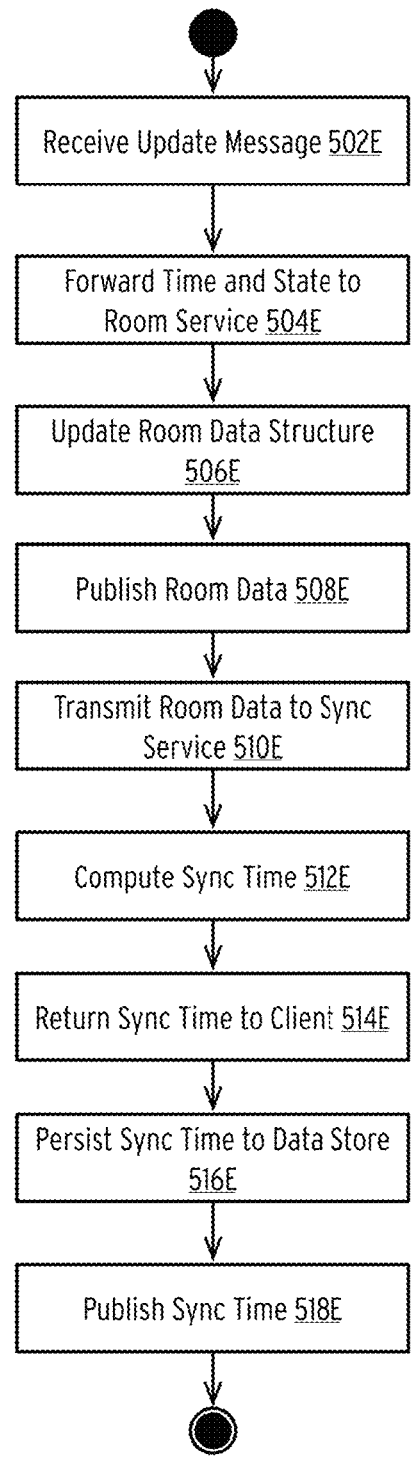
FIG. 5E is a flow diagram illustrating a method for updating a sync time according to some embodiments of the disclosure.
Figure 5F:
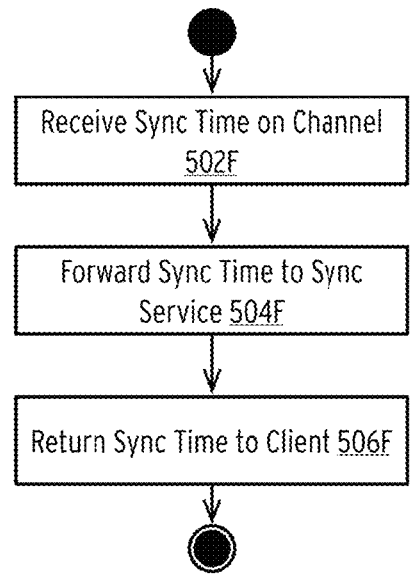
FIG. 5F is a flow diagram illustrating a method for receiving a new sync time according to some embodiments of the disclosure.
Figure 5G:
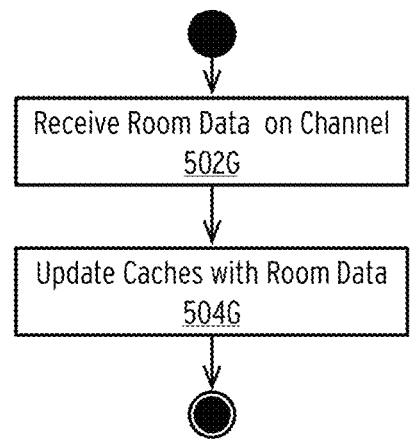
FIG. 5G is a flow diagram illustrating a method for updating a room cache according to some embodiments of the disclosure.
Figure 5H:
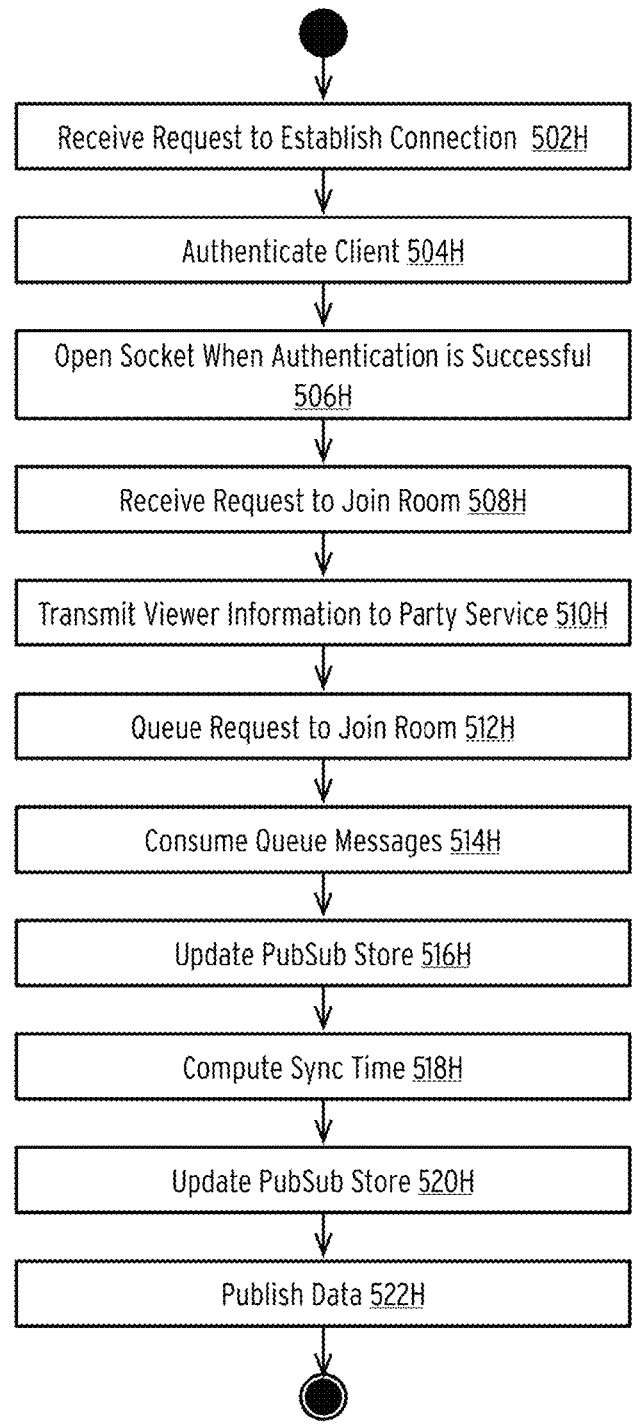
FIG. 5H is a flow diagram illustrating a method for updating a room data structure according to some embodiments of the disclosure.
Figure 5I:
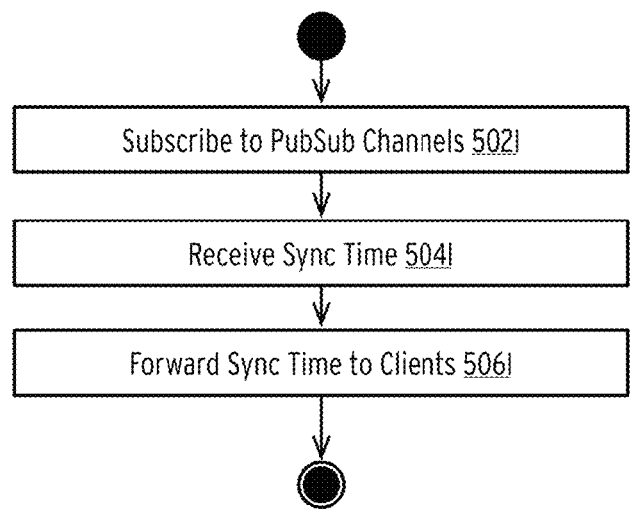
FIG. 5I is a flow diagram illustrating a method for receiving updated sync data according to some embodiments of the disclosure.

In the illustrated embodiment, the video SDK (220) manages the playback of multimedia files (508a; FIG. 5B). For example, video SDK (220) may comprise a library linked with the co-watching UI (218). Upon starting a stream, the co-watching UI (218) instantiates an instance of the video SDK (220) and receives streaming multimedia output from the video SDK (220) for presentation in the co-watching UI (218). In one embodiment, the video SDK (220) is a wrapper around a media player pre-installed in the client device (202). For example, video SDK (220) may comprise a wrapper around ExoPlayer in an Android® environment or AVPlayer in iOS®. Thus, in the illustrated embodiment, existing media player technologies may be used in the video SDK (220).

The video SDK (220) manages the retrieving of stream data, manifests, as well as actual multimedia content. In the illustrated embodiment, the video SDK (220) communicates with the application programming interface (API) (230) of a video backend (208) to retrieve a manifest for a given stream (502b). The video SDK (220) may also communicate with a manifest API (232) of the video backend (208) to periodically receive new manifests during the playback of streaming content (504b). In one embodiment, the manifest describes a single camera of live video content. However, in other embodiments, multiple camera angles may be used to provide multiple streams of a single event.

The video backend (208) may comprise a server, or multiple servers, handling traditional multimedia streaming applications and details of such systems are not expanded upon in detail herein. In the illustrated embodiment, the API (230) may receive a request to get a stream from the video SDK (220). In one embodiment, the request includes a unique universal identifier (UUID) of a content item as well as a geographic location of the client device (202). In one embodiment, the UUID may comprise an identifier of a sporting event that is streaming live. The geographic location may comprise a global positioning system (GPS) position, a geohash, Internet Protocol (IP) address, or other geographically identifying data. The API (230) may query a content backend (not illustrated) first to determine if the client device (202) device is authorized for the stream. Continuing the sporting example, the API (230) may confirm that a user is not subject to local blackout conditions and is thus authorized to view the stream. As will be discussed in the descriptions of FIGS. 3 and 4, an authentication system (not illustrated) may confirm that a user is authorized to access the streams at a threshold level (i.e., is a paying account holder), however that authentication may alternatively be implemented in API (230).

In response to the client request, the API (230) returns an initial manifest that describes the stream (502b). The manifest may comprise an M3U8 or MPD file, the details of which are not described herein. The API (230) may also provide a streaming API (SAPI) authentication token to enable communications between video SDK (220) and manifest API (232). In the illustrated embodiment, the video SDK (220) communicates periodically with manifest API (232) during the streaming of content (504b). In one embodiment, the video SDK (220) can request a new manifest from manifest API (232) as needed to advance the playback of a set of multimedia segments. The video SDK (220) downloads multimedia segments from CDN (206) (506) and displays the segments on the client device (508b), which are uploaded by a multimedia provider (210), such as a live event recording system. Details of using manifests to download segments of a multimedia stream repeatedly are not described in detail herein, and any techniques similar to HLS or DASH may be used.

In the illustrated embodiment, the video SDK (220) includes a video synchronization module (222). In the illustrated embodiment, the video synchronization module (222) coordinates the synchronization of the playback of a multimedia file. As discussed above, this synchronization may be performed entirely on the client or via communication with a video synchronization backend (204). Thus, communication between the video synchronization module (222) and video synchronization backend (204) is optional, as indicated by the dashed line in FIG. 2.

In a client-only mode (510a), the video synchronization module (222) synchronizes playback of streaming media based solely on data in the manifests returned by manifest API (232) as well as the current time. As described above, the current time may be retrieved from a time server using NTP. Since NTP, or similar protocols, are used, the "current" time can be synchronized across all devices in the system, including different client devices. The video synchronization module (222) may employ one or more synchronization strategies to analyze incoming manifests and adjust the playback or a streaming media file, which are discussed in more detail herein. Further details of the client-only mode are provided herein.

In the illustrated embodiment of FIG. 5C, the video synchronization module (222) computes the current latency of a client device (202). In the illustrated embodiment, the current latency refers to the distance between the timestamp of a currently playing frame and the value of $T_{NOW}$. As discussed, the value of $T_{LIVE}$ may comprise a value a fixed distance from $T_{NOW}$, and $T_{NOW}$ may be provided by a clock synchronization server. Alternatively, or in conjunction with the foregoing, the value of $T_{NOW}$ may be provided by a pre-installed library of the client device (202), wherein synchronization of the value of $T_{NOW}$ is managed by the operating system. In one embodiment, the video synchronization module (222) reads the timestamp value of a current frame (e.g., $T_{P1}$) (502c). In one embodiment, the value of $T_{P1}$ can be obtained by querying the video player for the current time of the player item (e.g., via the currentTime method of an AVPlayer object in iOS®). The video synchronization module (222) then computes the offset between $T_{P1}$ and $T_{LIVE}$. In one embodiment, the video synchronization module (222) retrieves or computes the value of $T_{LIVE}$ (504c) by retrieving the current, synchronized time ($T_{NOW}$) from, for example, a time server and subtracts a fixed offset value that is retrieved from configuration module (212). In one embodiment, the fixed offset value (i.e., $T_{NOW}-T_{LIVE}$) may be 25-45 seconds, but the specific value may be determined based on the time required to encode and slice recorded live content, as discussed. Thus, at the end of the foregoing method, the video synchronization module (222) obtains a latency (also referred to as the "drift") value of the client (506c). In some embodiments, this method can be performed for all frames or for a subset of frames.

Next, the video synchronization module (222) retrieves or calculates a target value of $T_X$ to synchronize the stream (508c). In one embodiment, the configuration data stored in the configuration module (212) includes a global target latency value (e.g., x seconds behind $T_{NOW}$). In one embodiment, this is a fixed value (e.g., all clients should remain five seconds behind $T_{NOW}$) In one embodiment, the value is computed for an individual stream based on the stream properties such as the live window size of the manifest. In one embodiment, the live window size can be computed as the difference between $T_{LIVE}$ and the product of the number of segments in the window and the duration of a segment. That is, $T_{LiveWindowSize}=T_{LIVE}-(SegmentCount* SegmentDuration)$. In this embodiment, the video synchronization module (222) selects a value of $T_X$ that is between $T_{LIVE}$ and $T_{LiveWindowSize}$. In one embodiment, this calculation is deterministic and can be computed identically regardless of which client device is computing $T_X$. Thus, after performing the foregoing method, the video synchronization module (222) obtains a target value of $T_X$ and next attempts to ensure that the timestamp of a currently displayed frame is equal to $T_X$, or within a window of $T_X$ (510c). Four alternatives of synchronizing the current timestamp of a frame to $T_X$ are discussed below.

In a first strategy, the video synchronization module (222) uses the playback speed of a video player to reach $T_X$. As discussed, the video SDK (220) may include a media player such as ExoPlayer on Android® or AVPlayer on iOS®. Such a video player supports methods to fast forward or slow down a given multimedia file. Generally, these methods are called in response to user interactions with UI elements, but can also be controlled programmatically. Generally, during normal playback, the speed of playback is 1.0. To speed up playback, the video synchronization module (222) can increase the speed to greater than 1.0. To slow down playback, the video synchronization module (222) can decrease the speed to less than 1.0 (but generally greater than 0, which is paused). Upon computing $T_X$, the video synchronization module (222) inspects the timestamp of the current frame and adjusts the speed value accordingly. For example, if the timestamp is ahead of $T_X$, the video synchronization module (222) reduces the speed value to slow down playback and vice-versa. The video synchronization module (222) monitors the values of timestamps while adjusting the speed until the value of the current frame's timestamp is equal to $T_X$ (or within a threshold distance). Upon reaching $T_X$ (or within a threshold distance), the video synchronization module (222) sets the speed value to normal playback (e.g., 1.0).

In a second strategy, the video synchronization module (222) seeks through the multimedia stream to "jump" to the value of $T_X$. For example, an instance of AVPlayer in iOS® includes a seek(to:) method to set the current playback time to the specified time. ExoPlayer in Android® includes a similar method. In one embodiment, the video synchronization module (222) issues the computed value of $T_X$ to the video player to seek directly to the time $T_X$. In one embodiment, the video synchronization module (222) may stagger seeking if the value of $T_X$ is significantly different (e.g., further from) the current timestamp of the playing frame. For example, if the distance is five seconds, then the video synchronization module (222) can seek+1 second, pause for 0.5 seconds, seek+1 second, etc. until reaching $T_X$. In general, the use of seeking will result in the client reaching $T_X$ faster, but may result in a "choppy" video when the distance between the current frame time and $T_X$ is large. In one embodiment, the first and second strategy may be combined wherein the second strategy is used upon starting a stream since the jaggedness of video is an acceptable tradeoff. The first strategy may then be used during playback to enable smoother transitions between a current time and $T_X$.

In a third strategy, the video synchronization module (222) may utilize the 'ts' parameter (or similar delay parameter) of a stream to meet $T_X$. Generally, the use of a ts (timestamp) parameter is only used when the distance between $T_X$ and $T_{LIVE}$ is above a threshold. Generally, this threshold is met when "rewinding" to past portions of a stream. In this scenario, the needed content at $T_X$ is not present within buffered multimedia segments, and thus a new manifest request is required to load the necessary files. Thus, the video synchronization module (222) uses the value of $T_X$ to generate a ts (or delay, etc.) value to issue a new request for a new manifest and playback the stream at that time. The third strategy may also be used with the first and second strategies.

Finally, a fourth strategy may comprise pausing the video streaming to reach the value of $T_X$. This strategy may be combined with the first, second, and third strategies. In this strategy, the current timestamp of the streaming file is ahead of $T_X$. Thus, the video synchronization module (222) pauses the video and waits until the multimedia file is delayed to $T_X$. Meanwhile, other devices behind $T_X$ will continue playing, and at time $T_X$, all devices will be synchronized.

In some embodiments, the video synchronization module (222) is configured to handle both client and server discontinuities. In one embodiment, a client discontinuity may arise due to rebuffering caused by backgrounding and resuming the streaming media application (214). In this scenario, the video synchronization module (222) maintains a timer upon detecting a discontinuity (e.g., backgrounding). When the streaming media application (214) resumes, the video synchronization module (222) utilizes the timer data to determine the distance to $T_X$ to resume synchronization.

In some embodiments, a server-side discontinuity may be generated due to dynamic ad insertion or slate insertion whereby a stream is "interrupted" by a personalized advertisement. In one embodiment, client devices may receive differing inserted content lengths. For example, an advertisement for one client is 30.25 seconds long while another client receives a 29.5 second-long advertisement. In one embodiment, the video synchronization module (222) recalculates the drift based on the length of the inserted content and re-computes the distance to $T_X$ accounting for the inserted content.

In some embodiments, the video SDK (220) may further be configured to report analytics or instrumentation data to the video synchronization backend (204). In one embodiment, this data is used to refine the configuration stored in the configuration module (212). In one embodiment, the video SDK (220) may transmit data when the video player changes a playback rate using any of the four strategies above. In one embodiment, the video SDK (220) transmits the session identifier, current position, target position, and new playback speed. In one embodiment, the video SDK (220) may also transmit data indicating that the video player was repositioned to synchronize to a new time point. In one embodiment, the video SDK (220) removes any rebuffering time from the event and only transmits the target position, current position, and session identifier. Finally, the video SDK (220) may periodically transmit a beacon signal that includes the session identifier, current position, and target position while the stream is being consumed.

Although not illustrated, the streaming media application (214) may also be configured to establish a video conference between client devices and display the video conference along with a streaming multimedia file. For example, a streaming sporting event may be displayed at the top of the stream, while individual video feeds for each client device are displayed in a grid below the sporting event. In some embodiments, the video streams recorded by each client device may be synchronized in the same manner as the live event stream. In other embodiments, the video conference may be implemented using WebRTC or similar peer-to-peer technologies. In some embodiments, existing video conference software solutions may be used to implement the video conferencing portion of the streaming media application (214).

In a client-server model (512a), the video synchronization module (222) may optionally implement all functionality of the client-only mode. Additionally, in this mode, the video synchronization module (222) is configured to communicate with a video synchronization backend (204). Details of specific implementations of video synchronization backend (204) are provided in the descriptions of FIGS. 3 and 4 and are not repeated herein. In brief, the video synchronization backend (204) includes one or more publish-subscribe (PubSub) data stores, such as PubSub data stores (226). Examples of PubSub data stores include Redis® data stores. In the illustrated embodiment, these PubSub data stores (226) manage state data for "rooms" of client devices viewing the same stream. Additionally, these PubSub data stores (226) store drift data for each client device. When a client device (202) joins a room, the video synchronization module (222) transmits a join message to the video synchronization backend (204) that includes the client device's timing information and session or authentication tokens. As illustrated, the video synchronization module (222) issues this request to one or more socket servers (e.g., socket server 224). In one embodiment, socket servers (e.g., socket server 224) may comprise WebSocket servers and may comprise more than one active server. In the illustrated embodiment, the socket servers (e.g., socket server 224) are coupled to the PubSub data stores (226) via a network and thus are decoupled from the persistence layer.

In response to a request to join a room, the socket servers (e.g., socket server 224) create a room in the PubSub data stores (226) to manage the room participants and timing information.

During playback of a multimedia file, the video synchronization module (222) periodically transmits messages to the socket servers (e.g., socket server 224) with updated timing information. In one embodiment, the client device (202) transmits its current time difference (i.e., the difference between the current time and a timestamp of a currently played frame) as well as a session identifier. In one embodiment, the client device (202) and, in particular, the video synchronization module (222) generates a session identifier when joining a room and transmits this session identifier to the socket servers (e.g., socket server 224). The socket servers (e.g., socket server 224) then associate this session identifier with a given session for the client device (202) for all future requests (including update messages). The socket servers (e.g., socket server 224) push this data into a queue (228), which may comprise a streaming message queue. The received timing information is then used to update the room data structure in the PubSub data stores (226). In one embodiment, a compute engine (not illustrated) may consume the streaming message queue data and calculate the ideal time difference for a given room and stores the time difference for a room in the room data structure. Details of a client-server implementation are provided in more detail in FIGS. 3 and 4 and are not repeated herein.

Figure 3:
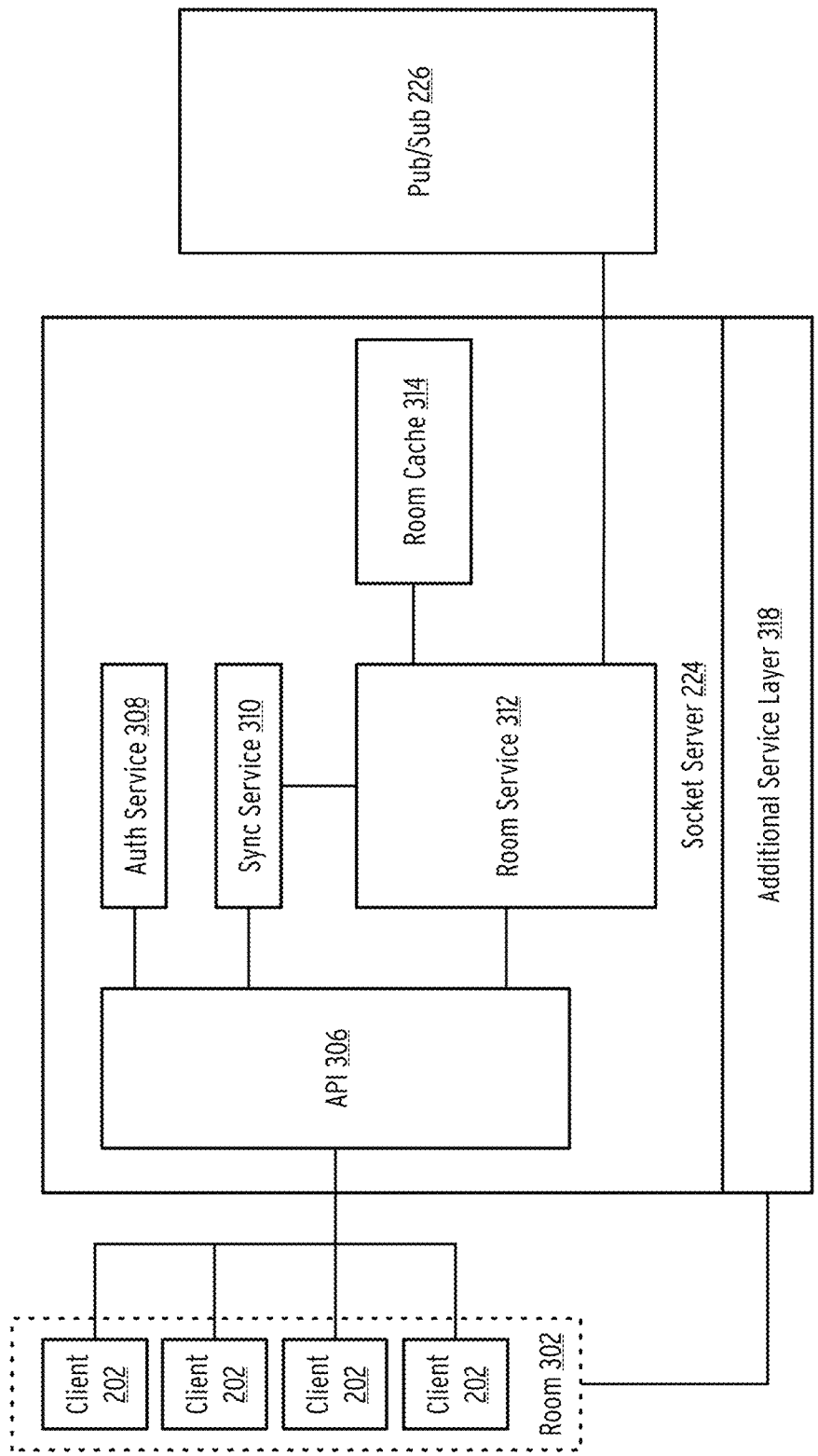
FIG. 3 is a block diagram of a computing system for synchronizing streaming media content according to some embodiments of the disclosure.

FIG. 3 is a block diagram of a computing system for synchronizing streaming media content according to some embodiments of the disclosure.

In the illustrated embodiment, a plurality of client devices (e.g., client device 202) is communicatively coupled to a socket server (224) as well as an additional service layer (318). Details of client devices (e.g., client device 202) and an overview of the socket server (224) were provided in the description of FIG. 2, and those details are not repeated herein.

In the illustrated embodiment, the plurality of client devices (e.g., client device 202) is logically represented as a "room" (302). In the illustrated embodiment, the room (302) is not a physical structure or constraint but rather a virtual environment the client devices (e.g., client device 202) join. Thus, client devices (e.g., client device 202) may be geographically separated but still associated with a single room (302). The room (302) ultimately is represented as a data structure stored in PubSub stores (226), which was described previously.

In the illustrated embodiment, the socket server (224) includes an API (306). In the illustrated embodiment, client devices (e.g., client device 202) issue requests to the socket servers (224) exclusively through API (306). The API (306) communicates with an authentication service (308) to authenticate users requesting to join rooms. The API (306) communicates with room service (312) to add and remove users to a given room. The room service (312) retrieves room data from the PubSub data stores (226). The room service (312) caches data describing the room in the room cache (314) and transmits the synchronization data to the synchronization service (310). The synchronization service (310) forwards the target synchronization time ($T_X$) to the API (306), which transmits the $T_X$ value to the client devices (e.g., client device 202). Finally, the room service (312) subscribes to a channel associated with the room data. After subscribing, the API (306) pushes any updates to the room data or synchronization data to the client devices (e.g., client device 202). Details of opening a socket connection and joining a room are described in more detail herein.

In the illustrated embodiment, the API (306) comprises a network endpoint. In one embodiment, the HTTP path of the endpoint may include a room identifier. For example, the path may be "/synci<roomID>/<viewerID>" where roomID comprises an identifier of a room, and viewerID comprises a unique identifier for the user of the client device (202). When the client device (202) is about to join a room, it opens a connection to the socket server (224) with the room ID indicated in the path (502d). In some embodiments, the request additionally includes an authentication token used to authenticate a user. In one embodiment, the API (306) transmits the authentication token to authentication service (308) for authentication (504d). Any techniques capable of authenticating a network user may be employed by the authentication service (308).

In one embodiment, the system confirms that the HTTP requests are coming from a known client. In one embodiment, a shared secret may be used. In this embodiment, a shared secret is generated at build time of the client application and shipped with the video SDK. During operation, the video SDK generates an X-Auth HTTP header based on this secret and attaches it to the stream requests made over SSL/TLS. The secret is then validated at video backend API and establishes the fact that the incoming streams request is indeed coming from an authenticated video SDK.

Additionally, the system also authenticates and authorizes a given room session. To authenticate that an incoming socket connection request for joining/creating a room session, the system may generate an authentication token at the video backend (208), and validate it at the socket servers (e.g., socket server 224), with a shared key secret. The video SDK (220) then sets the X-Auth HTTP header, user agent, and other query params needed by API (230) when issuing requests to the API (230).

API (230) stream responses will have an authentication token added as part of the response header over SSL. This token will have an expiry, and it will be generated using the shared secret, the video SDK's user agent, a session identifier, and video session (vs) param generated by the video SDK (220). The video SDK (220) will include this token in the HTTP header for the requests made over SSL to establish a connection with socket servers (e.g., socket server 224), where this token will get validated, and the request will get authorized for a provided session identifier.

The authentication service (308) returns a value indicating whether the authentication was successful. If not, the API (306) rejects the request and returns an error to the client device (202) that sent the request. Alternatively, if the authentication is successful, the API (306) opens a socket connection with the client device (202) (506d) and proceeds to join or create a room, as will be described.

To join a room, the API (306) transmits the room identifier and viewer identifier to the room service (312) (508d). In the illustrated embodiment, the room service (312) may comprise a library of the socket server (224). The room service (312), in response, attempts to load data related to the room from the room cache (314). Various cache types may be used, such as a least recently used (LRU) cache, and the cache type is not limited. In the event of a cache miss or cache invalidation, the room service (312) will retrieve data relating to the room from the PubSub data stores (226) (510d). In one embodiment, a "room" in the PubSub data stores (226) is represented by a hash in the PubSub data stores (226). In one embodiment, the room hash has a key having the format "room:<room-id>" where "room-id" is the room identifier transmitted in the path of the network request. In one embodiment, the hash has sub-keys for a current time of the room, and a plurality of sub-keys for each user, each of the user sub-keys is associated with a per-user time and a state value, as follows:

```
sub-keys:
    room.time <time-value>
    viewer:<viewer-1-id>.time      <time-value>
    viewer:<viewer-1-id>.state     <state-value>
    viewer:<viewer-2-id>.time      <time-value>
    viewer:<viewer-2-id>.state     <state-value>
```

If the room data structure is not in the room cache (314), the room service (312) retrieves it from the PubSub data stores (226) using the room identifier and writes it to the cache (314) (512d). In one embodiment, the cache (314) comprises an in-memory data cache. In one embodiment, the data model of the cache (314) is as follows (for a given room):

```
{
    "viewers": {
        "<viewer-id>": {
            "time": <time-value>,
            "state": <state-value>
        },
        ...
    },
    "room": {
        "id": <room-id>,
        "time": <time-value>
    }
}
```

The room service (312) then forwards the room data to the synchronization service (310) (514d), which computes a sync time ($T_X$) based on the time-value of the room and the time values of each viewer (516d). Various methods, described below, may be used to calculate a sync time.

In a first method, a stay latest algorithm is employed. In this method, the synchronization service (310) optimizes to keep all the client devices (e.g., client device 202) synchronized to $T_{P1}$, where $T_{P1}$ comprises the client device (202) display a frame having a timestamp closest to $T_{LIVE}$. Thus, as one implementation, the synchronization service (310) may first identify the client device (202) having a time value closest to $T_{LIVE}$ and then compute the offsets for all other client devices to that time value. If all of the computed offsets are below a threshold, the method may be used. In one embodiment, this method is used when each client device's current frame timestamp ($T_{P1}$, $T_{P2}$, etc.) are watching the same, or nearly the same, exact frame at any given moment. This method additionally minimizes the gap between $T_{NOW}$ and the timestamps of a currently displayed frame.

In a second method, the synchronization service (310) may utilize a min-sum algorithm to compute the sync time ($T_X$). In this method, $T_X$ is selected as a time that requires the least amount of speeding up or slowing down for each client. In one embodiment, the min-sum algorithm computes a centroid of all client device (202) time points ($T_{P1}$, $T_{P2}$, etc.) and uses that centroid value as $T_X$. This second method comprises the least obstructive method as the value of $T_X$ is normalized across client devices (e.g., client device 202).

Ultimately, synchronization service (310) transmits the value of $T_X$ back to the API (306), and the API (306) forwards the value of $T_X$ to all client devices (e.g., client device 202) when a client device joins the room (518d). As will be discussed, the synchronization service (310) re-computes the value of $T_X$ periodically using the same methods and thus continually updates the value of $T_X$.

In the illustrated embodiment, joining is implied when the client device (202) successfully established a socket connection with the socket server (224). The client device (202) should continue playback without syncing to anything until a further message from the socket server (224), described below.

Alternatively, when a user joins an existing room, the socket server (224) will transmit a message, including the target offset (to $T_X$), based on the offsets of the client device (202) joining the room. In response, the client device will sync to a PDT value based on this offset (also referred to as a "room gap") during playback. The payload for this message sent by the socket server (224) is provided below:

| key | value | description |
|---|---|---|
| info | sync | sync update |
| to | <number> | target offset, the current room offset based on viewer's offsets and calculated by synchronization service (310) |

Finally, after the synchronization service (310) transmits the target offset $T_X$, the room service (312) subscribes to a channel of the PubSub stores (226). Thus, when data associated with the room changes, this data is forwarded to room service (312) from the PubSub data stores (226), and the room service (312) can initiate a re-computation of $T_X$ as described above and as explained in more detail below.

Periodically during playback, each client device (202) will transmit an update message to API (306), and the API (306) will receive this message (502e). This update message informs the socket server (224) of both the state of the client device as well as the current timestamp of the currently displayed frame of the multimedia stream. Updates can be transmitted in various circumstances including, but not limited to when content is being displayed (e.g., played back), advertisements are playing, playback is being synchronized, the client is rebuffering, or the client has paused the stream. Various other conditions may be utilized. In the illustrated embodiment, the update message includes a status field indicating such a status and a current offset ("co") field storing the timestamp (e.g., PDT) or offset.

In the illustrated embodiment, each client device (202) transmits its current timestamp (e.g., PDT) in the update message at regular intervals. In some embodiments, this interval is 2-4 seconds, to avoid flooding the socket server (224). Further, the client devices (e.g., client device 202) may only be configured to transmit current timestamps upon detecting a synchronization drift exceeding a pre-configured threshold.

The API (306) then extracts the timestamp and state and forwards this data to the room service (312) (504e). The room service (312) generates an update message for the PubSub data stores (226) and updates (506e) the room data with the timestamp and state value received from the client device (202). Next, the room service (312) publishes (508e) the new data for the user on the channels for the room. As discussed, each client device (202) establishes a channel for a room to receive the updated room data. Each client receives this published data and updates their own room cache of the room data (e.g., to manage room activities). Next, the room service (312) retrieves the cached room data from room cache (314) and transmits the cached room data to the synchronization service (310) (510e). As described above, the synchronization service (310) computes the sync time (512e) based on the room data using one or more algorithms. In some embodiments, the synchronization service (310) may further determine if the computed sync time exceeds a pre-configured threshold and, if so, may terminate synchronization.

As in the previous method, the synchronization service (310) then transmits the sync time to the API (306), which forwards the sync time to the client devices (e.g., client device 202) (514e). Next, the synchronization service (310) transmits the sync time back to the room service (312), and the room service (312) updates the sync time stored in the PubSub data stores (226) (516e). Finally, the room service (312) publishes the new sync time (518e) to a channel subscribed to by all other client devices (e.g., client device 202), and thus the client devices (e.g., client device 202) all receive the new sync time ($T_X$). Details of this channel subscription are provided below.

As described above, when a given client updates its timestamp or time gap value, the socket server (224) will ultimately re-calculate a new sync time value ($T_X$) and publish this value to all other clients. Thus, from the perspective of a client device that did not transmit the update message described above, the following method occurs.

Prior to the method, other client devices playback content. A room service (312) receives the new sync time ($T_X$) via a subscription to a sync time channel associated with a given room (502f). The room service (312) forwards the sync data to the synchronization service (310), which forwards the sync time ($T_X$) to the API (306) (504f), which returns the data back to the other clients (506f). Thus, each client receives a new sync time ($T_X$) using a PubSub channel. Notably, no write to the PubSub store is made in this method.

In one embodiment, the channel for receiving new sync time data may have the following format:

```
name: room: <room-id>.room
message (serialized JSON):
{
    "time": <time-value>
}
```

Additionally, various other improvements may be implemented as follows. These improvements may equally be applied to the embodiment in FIG. 4.

In some embodiments, the socket server (224) will only publish sync times when the value of the sync time changes. Further, the socket server (224) will publish the room timestamp to the client, only if it requires syncing, i.e., last updated timestamp differs from the room timestamp by more than a pre-defined threshold.

Further, in some embodiments, the socket server (224) will consider the network latency when computing the sync time. Specifically, the socket connection, though persistent, suffers from usual network latency. Any timestamp communicated over the channel shall reach the destination after some delay and hence needs to be adjusted. This is applicable to both client-server or server-client communication flow. To account for this adjustment, client devices populate their own device time in the update payload. The server can determine the network latency based on the timestamp it receives/processes the payload. Similarly, the server shall populate its own system time with every sync payload, for clients to make the adjustment.

Finally, in the foregoing embodiments, the transmitted time information comprises a timestamp (in, for example, Unix time). However, the use of timestamps requires the above adjustments for latency. However, in some embodiments, more accurate and less complex solutions can be implemented by replacing the timestamp by a time gap value. The time gap value is a difference (e.g., in milliseconds) between the current time (i.e., $T_{NOW}$) and the PDT of a current segment of a streaming multimedia file. Thus, the time gap provides a sense of where participants are with respect to each other. The following table illustrates an exemplary scenario:

|  | P1 | P2 | P3 | P4 |
|---|---|---|---|---|
| $T_{NOW}$ |  | Jul. 13, 2020 12:52:33.425 |  |  |
| PDT | Jul. 13, 2020 12:51:49.562 | Jul. 13, 2020 12:51:50.134 | Jul. 13, 2020 12:51:49.562 | Jul. 13, 2020 12:51:52.625 |
| Gap | 43863 | 43291 | 43863 | 40800 |

In the illustrated embodiment, the gap value is computed by converting $T_{NOW}$ and the PDT values to Unix epoch values and subtracting P1, P2, P3, and P4 from $T_{NOW}$, respectively.

The socket server (224), on knowledge of this viewer's respective gap values, can easily compute an optimal room level gap value, which also serves as the sync time ($T_X$). In the above case, while P1 & P3 are at the same frame, P2 & P4 are ahead by different margins. The gap between viewers can then be leveraged to determine the sync-up value.

In this case, the stay latest algorithm determines that since P4 is ahead of all, the others need to sync. The values by which others need to sync would be $$43863-40800=3063 \text{ ms} \quad \text{P1:}$$

$$43291-40800=2491 \text{ ms} \quad \text{P2:}$$

$$43863-40800=3063 \text{ ms} \quad \text{P3:}$$

The socket server (224) then sends the above sync gap values in the sync payload (as compared to a fixed sync time), which client devices can use without the need for any adjustments. Unlike an absolute timestamp, this sync value is relative to time; hence it can be applied irrespective of when the client receives the response. This value tells the client how far it needs to fast forward or rewind the segments to be in sync with the other client devices (e.g., client device 202).

Returning specifically to FIG. 3, and as indicated previously, each client device (202) is associated with a dedicated room cache (314). This room cache (314) is updated when a given client device transmits an update message. Specifically, when a given client device issues an update message, the corresponding room service (312) of the client device publishes the updated room data on a channel. All other client devices subscribe to this channel and receive the updated room data (502g). The other client devices then update their own cache with the new data (504g).

In one embodiment, the channel for receiving room data may have the following format:

```
name: room:<room-id>.viewer
message (serialized JSON):
{
    "id": "<viewer-id>",
    "time": <time-value>,
    "state": "<state-value>"
}
```

Finally, the system includes an additional service layer (318). This layer (318) may be used to store various non-critical services such as secure socket layer (SSL) or transport layer security (TLS) functionality, static web server functionality, key management, and logging/analytic s functionality. Additionally, as described above, client devices (e.g., client device 202) may periodically transmit events to the layer (318), which may be used to monitor system health as well as improve operating parameters of the system.

The foregoing embodiments in FIG. 3 and the accompanying methods perform the calculation of a room gap time on a server-based on client updates. Each process, associated one-to-one with a client device, maintains its own room cache which is updated based on PubSub channels. This embodiment, compared to a client-side implementation, results in a significantly simplified architecture involving only critical components on the server. In this manner, various aspects of the system may be upgraded without modifications to client-side code (e.g., modification of sync time calculation routines). In some scenarios, however, the use of PubSub channels may result in race conditions as clients are simultaneously attempting to update the room data. Further, the use of separate room caches for each client device may result in stale data being persisted. While these problems may not substantially impact the performance of the system, the following embodiments remedy these side effects.

Figure 4:
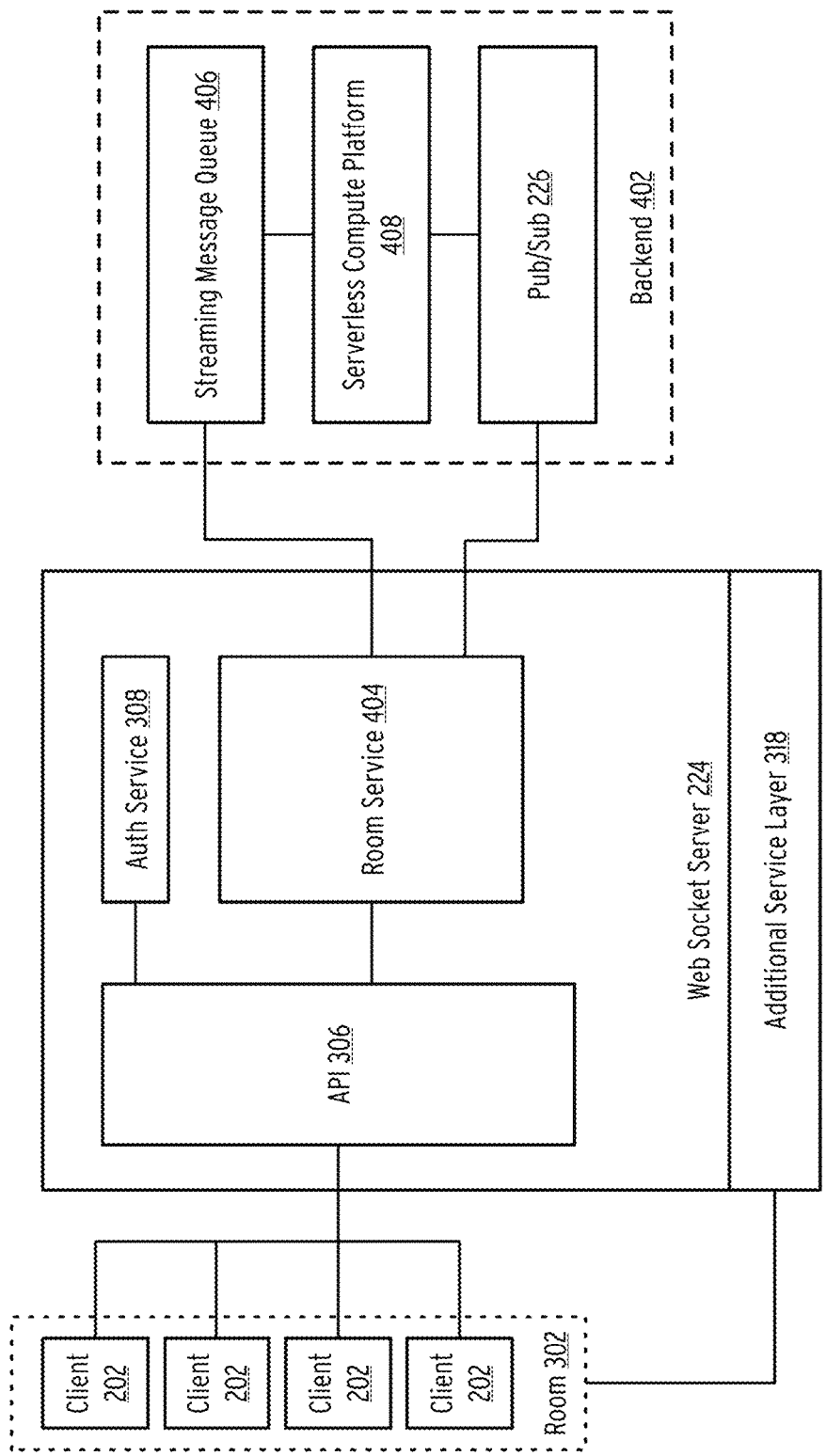
FIG. 4 is a block diagram of a computing system for synchronizing streaming media content according to some embodiments of the disclosure.

FIG. 4 is a block diagram of a computing system for synchronizing streaming media content according to some embodiments of the disclosure.

In the illustrated embodiment, various components bearing identical reference numerals have been described previously, and those details are not repeated herein. Notably, in FIG. 4, the sync service (310), room service (312), and room cache (314) are replaced with a room service (404). Further, a separate backend (402) is added that includes the PubSub data stores (226) as well as a streaming message queue (406) and a serverless compute platform (408). While the system in FIG. 4 provides the same functionality to client devices (e.g., client device 202), it performs the synchronization in a different manner to avoid race conditions and stale cache problems.

Various details of this method are similar to the method described in connection with FIG. 3. In brief, the API (306) receives an authentication request including an authentication token (502h). The authentication service (308) validates the token and confirms that the user is authenticated (504h). If not, the API (306) terminates the connection and, optionally, returns an error to the client. If the authentication is successful, the API (306) proceeds to open a socket connection with the client device (202) (506h).

In the illustrated embodiment, the client device may then submit a request for a current server time offset ($T_X$) for a given room identifier. In one embodiment, this request includes the clock time of the client device (co) In response, the API (306) retrieves the current value of $T_X$ for a given room identifier from the PubSub data stores (226) adds a first timestamp ($s_0$) of the server (i.e., the value of $T_{NOW}$ when the request is received) and a second timestamp ($s_1$) of the server (i.e., the value of $T_{NOW}$ when the request is sent). The API (306) then returns these three time values to the client device. When the client device receives the values of so and Si, the client device can compute its local clock time offset as compared to the server time via the following formula:

$$\mathit{offset} = \frac{(s_0 - c_0) + (s_1 - c_1)}{2},$$

where $c_1$ comprises the time the response is received. In some embodiments, the client device may use this offset to extend future values of $T_X$ to account for network delays. However, in some embodiments, the request for a server time offset may not be necessary if both the client device and socket server are synchronized via NTP.

Once the client device is connected to the socket server (224), the client device issues a request to join a room (508h). The format of this request is similar to the request discussed in FIG. 3. The API (306) receives the request and transmits the viewer information (time gap or timestamp as well as user identifier) to the room service (404) (510h). The room service (404) places a message representing the request to join a room into the queue (406) (512h). In one embodiment, this comprises issuing an UPDATE message to the queue (406) that uses the room identifier as the message group identifier to ensure the sequencing of messages since, in some embodiments, the queue (406) comprises a first-in-first-out (FIFO) queue.

In the illustrated embodiment, the serverless compute platform (408) consumes messages on the queue (406) in a FIFO order (514h). In some embodiments, traditional server compute platforms may be used instead. The platform (408) retrieves the room data from PubSub data stores (226) using the message content identifier (i.e., the room identifier) and updates the room data structure with the data in the queue message (similar to that performed in FIG. 3) (516h). The platform (408) then computes the sync time (either timestamp or time gap) (518h) using the algorithms discussed with respect to the sync service (310). The platform (408) performs a second update, updating the room data with the new sync time or gap (520h). Finally, the platform (408) publishes the new sync time or gap to a designated channel (522h) in a manner similar to that of FIG. 3.

Notably, the sync time calculation and updating of the PubSub data stores (226) are managed via a queue (406). This ensures a proper ordering of updates from multiple clients. Thus, client updates are processed in order, and there is no risk of race conditions due to simultaneous access to the underlying PubSub data stores (226). Further, since the backend (402) is separate from the socket server (224), the need for per-client room caches is avoided, and all data is canonically stored in PubSub data stores (226).

As discussed above, the platform (408) publishes a new sync time to a channel of the PubSub store. As in FIG. 3, all clients subscribe to this channel for updates. In the illustrated embodiment, the room service (404) subscribes to the respective channel for each client device (502i). When the platform (408) publishes the sync time, the room service (404) receives the sync time (504i) and forwards the new sync time to each client device (506i).

In the illustrated embodiment, the calculation of TX is performed by a separate compute platform and thus is not performed independently for each client device. Further, the use of a queue (406) ensures that messages are processed one at a time and in order, thus avoiding race conditions for data source updates.

Figure 7:
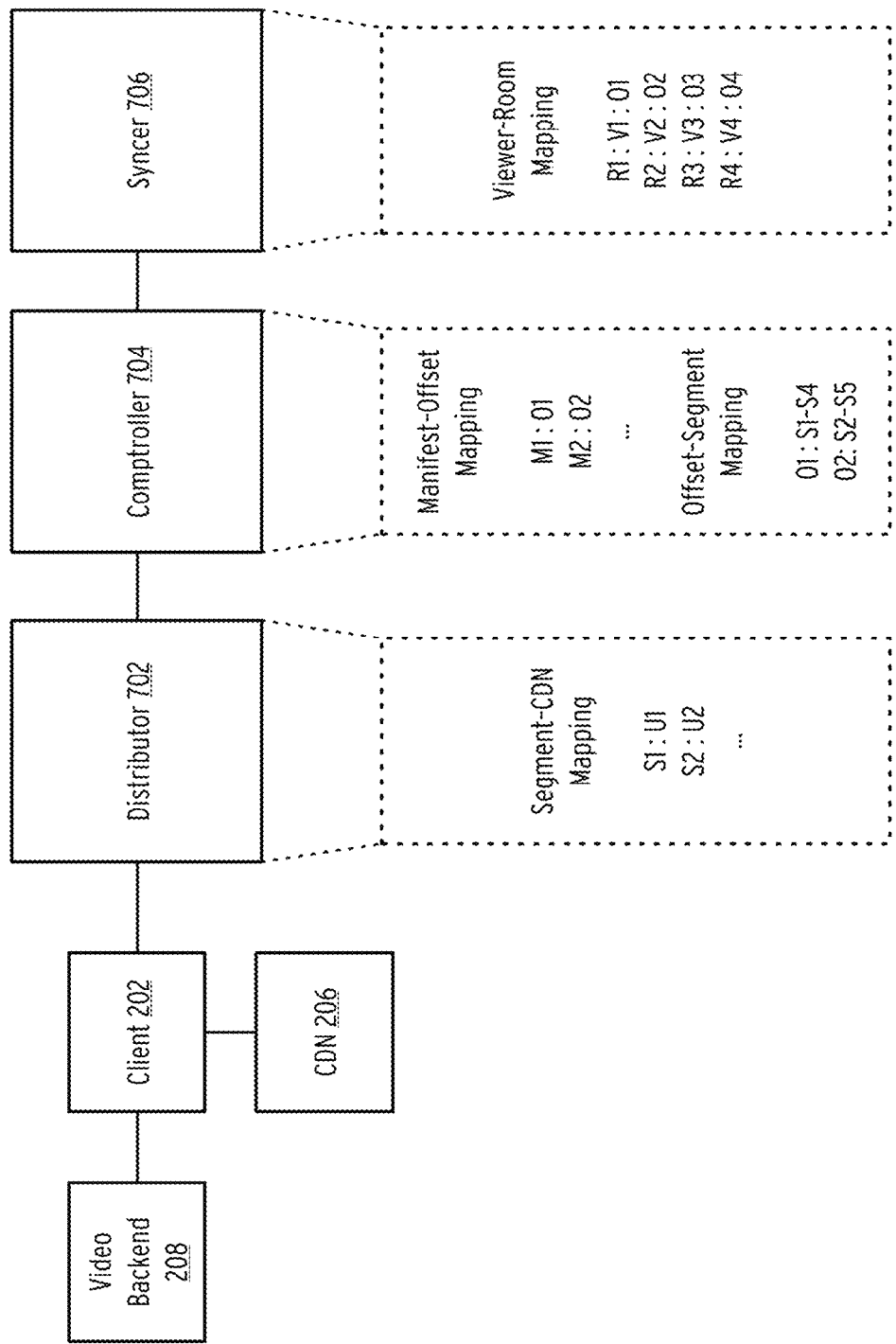
FIG. 7 is a block diagram illustrating a system for synchronizing streaming multimedia playback according to some embodiments of the disclosure.
Figure 8:
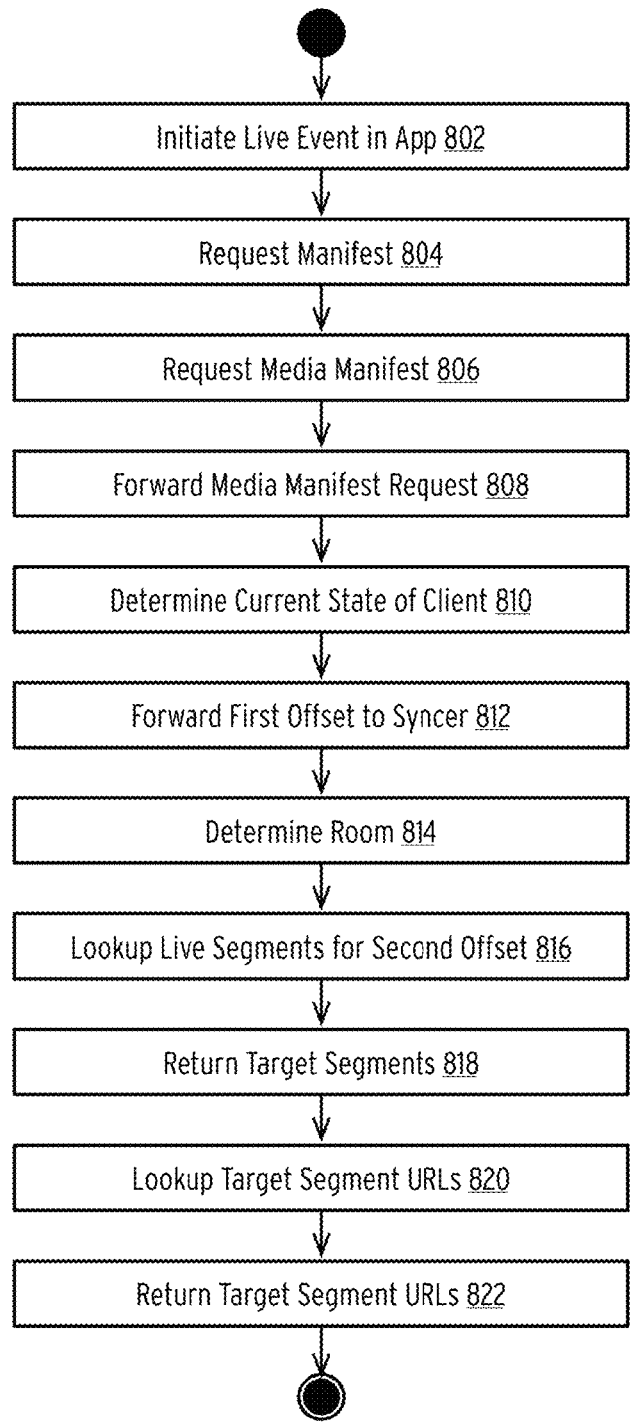
FIG. 8 is a flow diagram illustrating a method for synchronizing streaming multimedia playback according to some embodiments of the disclosure.

FIG. 7 is a block diagram illustrating a system for synchronizing streaming multimedia playback according to some embodiments of the disclosure.

The various approaches described above require some client-side implementation to achieve the target syncing. The embodiment in FIG. 7 presents an alternative approach, whereby using an end-to-end server-side solution, synchronized viewing can be achieved without any need for client-specific implementation. The illustrated embodiment supports any standard streaming protocol (e.g., HLS, DASH) and any platform (since no client-specific logic is required). Thus, the illustrated embodiment may be used in mobile apps, cable television, mobile browsers, or desktop browsers, as long as they support the streaming protocol. The illustrated embodiments additionally support DRM-protected or Ads-enabled content.

In the illustrated embodiment, a client device (202) retrieves manifests from video backend (208) and video data from CDN (206). The operations of these devices have been described and are not repeated. Notably, the client device (202) may comprise any general-purpose computing device capable of streaming and has no requirements on its software.

The client device (202) communicates over a network with a distributor (702). In the illustrated embodiment, the distributor (702) comprises a computing device (or devices) that serves a dynamically computed stream segment when requested by the client device (202). The distributor (702) serves the comptroller-determined segment to the client device (202) irrespective of the request URL. The request URL, through media manifest information, carries important data about the current state of the client device (202).

The distributor (702) communicates with a comptroller (704). The comptroller (704) keeps track of each client session and their room associations. The syncer (706) accepts target offsets from the syncer (706) and determines the target segment based on that. The syncer (706) then communicates that target segment to the distributor (702) whenever requested. In the reverse direction, the syncer (706) accepts the current state of the client from the distributor (702) and communicates to the syncer (706) for further processing.

The syncer (706) serves as a core component that runs with the capability to compute an optimum sync offset for all (or subset of) viewers. It takes the current playback offset of the clients as input and returns a target offset. The same logic can be extended to apply to a subset of viewers in isolation, i.e., target offset at room level.

Communications between each of the illustrated devices are described in more detail below.

A viewer of the client device (202) initiates the watching of a live event via a multimedia player in a browser or app (802).

As part of this operation, the client device (202) requests (804) manifest (e.g., MPD or M3U8) from the video backend (208). The video backend (208) may respond with any streaming protocol based on the standard rules in place. In one embodiment, the video backend responds with master manifest (e.g., for HLS or DASH) as per standard protocols.

Next, the client device (202) requests (806) a media manifest (M1) from the distributor (702). In one embodiment, the client device (202) requests this M1 manifest from the distributor (702) directly. In other embodiments, the video backend (208) may mediate the requests between a client device (202) and a distributor (702). In some embodiments, the request for the M1 manifest includes a cookie that identifies the user (e.g., "V1").

Next, the distributor (702) forwards (808) the request to the comptroller (704). In one embodiment, the request indicates that a given user (V1) is requesting the M1 manifest.

In response, the comptroller (704) determines the current state of V1 (810). In the illustrated embodiment, M1 can be tied to associated segments' PDTs, which in turn leads to an offset from a current clock time. For example, if the current time is TNOW and segments PDT is Ts, then offset is (TNOW−Ts). If M1 leads to an advertisement, then the rest of the method can be skipped, and ad segments can be directly served.

Next, the comptroller (704) forwards (812) the offset for the client (referred to as O1) to the syncer (706).

In response, the syncer (706) can determine a room (814) for the client device (or group association) (referred to as R1). As part of this step, the syncer (706) gathers the offsets for other viewers in that room and can employ an algorithm to determine an optimal offset for V1 (referred to as O2). Various algorithms for computing this offset have been discussed and are not repeated herein. The syncer (706) then responds to the comptroller (704) with the newly determined offset O2.

The comptroller (704) looks up (816) the live segments associated with offset O2. In the illustrated embodiment, the target duration determines the count of segments returned by the comptroller.

The comptroller (704) then returns (818) target segments to the distributor (702), which, in turn, looks up URLs for the target segments (820). In the illustrated embodiment, these target segment URLs are generally served by CDN (206). In some embodiments, however, the URLs may point to an origin server.

In some embodiments, the synchronization above may be selectively enabled and disabled by a client device. For example, a given client device in a room (or globally) may desire to view all content as quickly as possible (subject to their network constraints) and would thus disable any type of synchronized slowdown (or speedup). For example, a user may wish to watch the first half of a basketball game without synchronization then, may wish to a join a room to view with a friend. When joining the room, the client may explicitly enable synchronization. Further, during the last minute of the game, the user may desire to stop synchronization (e.g., stop a slowdown) to watch the game in (relative) real-time.

Finally, the distributor (702) returns (824) the segments in response to the client device (202) which, in response, retrieves the segments from the CDN (206) and plays the segments back as a regular live stream.

FIG. 6 is a block diagram illustrating a computing device showing an example embodiment of a computing device used in the various embodiments of the disclosure. The computing device (600) may include more or fewer components than those shown in FIG. 6. For example, a server computing device may not include audio interfaces, displays, keypads, illuminators, haptic interfaces, GPS receivers, cameras, or sensors.

As shown in the figure, the device (600) includes a processing unit (CPU) (622) in communication with a mass memory (630) via a bus (624). The computing device (600) also includes one or more network interfaces (650), an audio interface (652), a display (654), a keypad (656), an illuminator (658), an input/output interface (660), a haptic interface (662), an optional global positioning systems (GPS) receiver (664) and a camera(s) or other optical, thermal, or electromagnetic sensors (666). Device (600) can include one camera/sensor (666), or a plurality of cameras/sensors (666), as understood by those of skill in the art. The positioning of the camera(s)/sensor(s) (666) on the device (600) can change per device (600) model, per device (600) capabilities, and the like, or some combination thereof.

The computing device (600) may optionally communicate with a base station (not shown), or directly with another computing device. Network interface (650) is sometimes known as a transceiver, transceiving device, or network interface card (NIC).

The audio interface (652) produces and receives audio signals such as the sound of a human voice. For example, the audio interface (652) may be coupled to a speaker and microphone (not shown) to enable telecommunication with others or generate an audio acknowledgment for some action. Display (654) may be a liquid crystal display (LCD), gas plasma, light-emitting diode (LED), or any other type of display used with a computing device. Display (654) may also include a touch-sensitive screen arranged to receive input from an object such as a stylus or a digit from a human hand.

Keypad (656) may comprise any input device arranged to receive input from a user. Illuminator (658) may provide a status indication or provide light.

The computing device (600) also comprises input/output interface (660) for communicating with external devices, using communication technologies, such as USB, infrared, Bluetooth®, or the like. The haptic interface (662) provides tactile feedback to a user of the client device.

Optional GPS transceiver (664) can determine the physical coordinates of the computing device (600) on the surface of the Earth, which typically outputs a location as latitude and longitude values. GPS transceiver (664) can also employ other geo-positioning mechanisms, including, but not limited to, triangulation, assisted GPS (AGPS), E-OTD, CI, SAI, ETA, BSS, or the like, to further determine the physical location of the computing device (600) on the surface of the Earth. In one embodiment, however, the computing device (600) may through other components, provide other information that may be employed to determine a physical location of the device, including, for example, a MAC address, Internet Protocol (IP) address, or the like.

Mass memory (630) includes a RAM (632), a ROM (634), and other storage means. Mass memory (630) illustrates another example of computer storage media for storage of information such as computer-readable instructions, data structures, program modules, or other data. Mass memory (630) stores a basic input/output system ("BIOS") (640) for controlling the low-level operation of the computing device (600). The mass memory also stores an operating system (641) for controlling the operation of the computing device (600)

Applications (642) may include computer-executable instructions which, when executed by the computing device (600), perform any of the methods (or portions of the methods) described previously in the description of the preceding Figures. In some embodiments, the software or programs implementing the method embodiments can be read from hard disk drive (not illustrated) and temporarily stored in RAM (632) by CPU (622). CPU (622) may then read the software or data from RAM (632), process them, and store them to RAM (632) again.

The disclosure includes various devices which perform the methods and implement the systems described above, including data processing systems which perform these methods, and computer-readable media containing instructions which when executed on data processing systems cause the systems to perform these methods. In the illustrated embodiment, some methods (or steps thereof) are described as being performed by specific hardware or software components. However, no limitation is placed on which devices or software perform the described functionality.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments.

In this description, various functions and operations may be described as being performed by or caused by software code to simplify description. However, those skilled in the art will recognize what is meant by such expressions is that the functions result from execution of the code by one or more processors, such as a microprocessor, application-specific integrated circuit (ASIC), graphics processor, or a field-programmable gate array (FPGA). Alternatively, or in combination, the functions and operations can be implemented using special-purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which, when executed by a computing device, causes the device to perform various methods. The executable software and data may be stored in various places including, for example, ROM, volatile RAM, non-volatile memory or cache. Portions of this software or data may be stored in any one of these storage devices. Further, the data and instructions can be obtained from centralized servers or peer to peer networks. Different portions of the data and instructions can be obtained from different centralized servers or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read-only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine-readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors or components, a mobile device, a user terminal, a vehicle, a personal communications device, a wearable digital device, an electronic kiosk, a general-purpose computer, an electronic document reader, a tablet, a laptop computer, a smartphone, a digital camera, a domestic appliance, a television, or a digital music player. Additional examples of computing devices include devices that are part of what is called "the internet of things" (IoT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or another computing device that includes a memory and a processing device. The host system can include or be coupled to a memory subsystem so that the host system can read data from or write data to the memory subsystem. The host system can be coupled to the memory subsystem via a physical host interface. In general, the host system can access multiple memory subsystems via the same communication connection, multiple separate communication connections, or a combination of communication connections.

In some embodiments, the computing device is a system including one or more processing devices. Examples of the processing device can include a microcontroller, a central processing unit (CPU), special purpose logic circuitry (e.g., an FPGA, an ASIC, etc.), a system on a chip (SoC), or another suitable processor.

Although some of the drawings illustrate a number of operations in a particular order, operations which are not order-dependent may be reordered, and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof. In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

We claim:

1. A method comprising:
   receiving a request from a client device to join a room, the room associated with a plurality of other client devices streaming multimedia content;
   adding the client device to the room in response to the request;
   identifying, from the other client devices, a closest client device having a closest synchronization time closest to a live time of the multimedia content and computing a synchronization time based on the closest synchronization time; and
   transmitting the synchronization time to the client device, causing the client device to adjust playback of the multimedia content based on the synchronization time.

2. The method of claim 1, wherein adding the client device to the room comprises:
   transmitting a room identifier and a viewer identifier to a room service; and
   retrieving room data from one of a cache or a publish-subscribe source, the room data including a time-value of the room and time values of each of the other client devices.

3. The method of claim 1, wherein computing the synchronization time comprises utilizing a min-sum algorithm to compute the synchronization time relative to synchronization times of the other client devices.

4. The method of claim 1, further comprising transmitting the synchronization time to the other client devices, causing the other client devices to adjust playback of the multimedia content based on the synchronization time.

5. The method of claim 1, further comprising receiving a time value from the client device, recomputing the synchronization time based on the time value, and transmitting the synchronization time to the other client devices.

6. The method of claim 5, wherein the time value comprises one of a timestamp or time gap value.

7. A non-transitory computer-readable storage medium for tangibly storing computer program instructions capable of being executed by a computer processor, the computer program instructions defining steps of:
   receiving a request from a client device to join a room, the room associated with a plurality of other client devices streaming multimedia content;
   adding the client device to the room in response to the request;
   identifying, from the other client devices, a closest client device having a closest synchronization time closest to a live time of the multimedia content and computing a synchronization time based on the closest synchronization time; and
   transmitting the synchronization time to the client device, causing the client device to adjust playback of the multimedia content based on the synchronization time.

8. The non-transitory computer-readable storage medium of claim 7, wherein adding the client device to the room comprises:
   transmitting a room identifier and a viewer identifier to a room service; and
   retrieving room data from one of a cache or a publish-subscribe source, the room data including a time-value of the room and time values of each of the other client devices.

9. The non-transitory computer-readable storage medium of claim 7, wherein computing the synchronization time comprises utilizing a min-sum algorithm to compute the synchronization time relative to synchronization times of the other client devices.

10. The non-transitory computer-readable storage medium of claim 7, the steps further comprising transmitting the synchronization time to the other client devices, causing the other client devices to adjust playback of the multimedia content based on the synchronization time.

11. The non-transitory computer-readable storage medium of claim 7, the steps further comprising receiving a time value from the client device, recomputing the synchronization time based on the time value, and transmitting the synchronization time to the other client devices.

12. The non-transitory computer-readable storage medium of claim 11, wherein the time value comprises one of a timestamp or time gap value.

13. A device comprising:
   a processor;
   a storage medium for tangibly storing thereon logic for execution by the processor, the logic comprising instructions for:
   receiving a request from a client device to join a room, the room associated with a plurality of other client devices streaming multimedia content;
   adding the client device to the room in response to the request;
   identifying, from the other client devices, a closest client device having a closest synchronization time closest to a live time of the multimedia content and computing a synchronization time based on the closest synchronization time; and
   transmitting the synchronization time to the client device, causing the client device to adjust playback of the multimedia content based on the synchronization time.

14. The device of claim 13, wherein adding the client device to the room comprises:

transmitting a room identifier and a viewer identifier to a room service; and retrieving room data from one of a cache or a publish-subscribe source, the room data including a time-value of the room and time values of each of the other client devices.

15. The device of claim 13, wherein computing the synchronization time comprises utilizing a min-sum algorithm to compute the synchronization time relative to synchronization times of the other client devices.

16. The device of claim 13, the instructions further comprising transmitting the synchronization time to the other client devices, causing the other client devices to adjust playback of the multimedia content based on the synchronization time.

17. The device of claim 13, the instructions further comprising receiving a time value from the client device, recomputing the synchronization time based on the time value, and transmitting the synchronization time to the other client devices.

* * * * *